(12) United States Patent
An et al.

(10) Patent No.: US 11,151,860 B2
(45) Date of Patent: Oct. 19, 2021

(54) METHOD AND DEVICE FOR HAND PROTECTION AND RELATED PROTECTIVE GLOVE

(71) Applicant: Zhi Jia (Cheng Du) Technology Co., Ltd., Si Chuan (CN)

(72) Inventors: Yongliang An, Beijing (CN); Ke Xie, Si Chuan (CN)

(73) Assignee: Zhijia Technology (Beijing) Co., Ltd, Beijing (CN)

( * ) Notice: Subject to any disclaimer, the term of this patent is extended or adjusted under 35 U.S.C. 154(b) by 140 days.

(21) Appl. No.: 16/657,905

(22) Filed: Oct. 18, 2019

(65) Prior Publication Data

US 2020/0128891 A1     Apr. 30, 2020

(51) Int. Cl.
| | |
|---|---|
| *A41D 19/00* | (2006.01) |
| *G08B 21/18* | (2006.01) |
| *A41D 19/015* | (2006.01) |
| *G01P 15/00* | (2006.01) |
| *G01C 23/00* | (2006.01) |
| *G08B 21/02* | (2006.01) |
| *G01P 15/18* | (2013.01) |

(52) U.S. Cl.
CPC ....... *G08B 21/182* (2013.01); *A41D 19/0027* (2013.01); *A41D 19/015* (2013.01); *G01C 23/00* (2013.01); *G01P 15/00* (2013.01); *G01P 15/18* (2013.01); *G08B 21/02* (2013.01)

(58) Field of Classification Search
CPC ....... G08B 21/182; G08B 21/02; G01P 15/18; G01P 15/00; G01C 23/00; A41D 19/0027; A41D 19/015; A41D 13/081
See application file for complete search history.

(56) References Cited

U.S. PATENT DOCUMENTS

| | | | |
|---|---|---|---|
| 2009/0219709 A1* | 9/2009 | Chen | A41D 19/0157 362/103 |
| 2020/0029635 A1* | 1/2020 | Kiemele | G06F 3/014 |

* cited by examiner

*Primary Examiner* — Hongmin Fan
(74) *Attorney, Agent, or Firm* — FisherBroyles, LLP; Craig W. Mueller

(57) ABSTRACT

A hand protection method is provided that detects hand self-motion information and relative motion information between the hand and surrounding objects. The method also contemplates evaluating a risk level of the hand injured by surrounding objects according to the detected self-motion information and the detected relative motion information. An alarm is sounded if the risk rises above a predetermined risk level.

13 Claims, 5 Drawing Sheets

METHOD AND DEVICE FOR HAND PROTECTION AND RELATED PROTECTIVE GLOVE

CROSS-REFERENCE TO RELATED APPLICATIONS

This application claims priority to Chinese Patent Application No. 201811248273.2, filed on Oct. 25, 2018, entitled "Method and Device for Hand Protection and Related Protective Glove", which is incorporated herein by reference in its entirety.

FIELD OF THE TECHNOLOGY

The invention is related to domain of Personal Protection Equipment (PPE), specially related to a methodology, device and a type of glove related to hand protection.

BACKGROUND

In industry of machinery, construction, mining, oil & gas, laboratory, it's very common to use glove for hand protection. Take impact resistant glove for example, its developed based on basic glove with thermoplastic resin (TPR) on back of hand and length of finger. The intentions is, in case of incident (impact, crush or pinch), the TPR would function as a buffer to hand, and therefore reduce the injury to the glove user. The issue is, because of awareness level or behavioural model of the user, as well as the complexity of the working environment, the user might exposed himself under risk without aware of its existence, and the current PPE only can provide mitigation measure by reduce the level of injury passively, but cannot prevent the incident actively.

Therefore, it's very valuable and necessary to develop a new model of PPE can provide not only mitigation measure passively, but also provide prevention measure actively to the user

SUMMARY

Because of the gap and disadvantage of exiting PPE, this invention is to overcome the above mentioned issues with new methodology, device and setup As the first aspect of the invention, which related to a hand protection methodology, it comprises:

detecting self-motion information of the hand and relative motion information between the hand and surrounding objects;

evaluating a risk level of the hand injured by surrounding objects according to the detected self-motion information and the detected relative motion information; and sending out a corresponding level of alarm according to the risk level.

Optionally, wherein the self-motion information is acceleration data of the hand; the relative motion information is relative distance data between the hand and the surrounding objects.

Optionally, wherein the acceleration data comprises an acceleration value and an acceleration direction; the relative distance data comprises a distance value, a distance variation, and a distance changing speed.

Optionally, wherein the step of evaluating the risk level comprises: comparing the acceleration value with a first acceleration threshold;

when the acceleration value is less than the first acceleration threshold, comparing the sum of the distance values between the hand and each of the surrounding objects in every direction of the hand with a first distance threshold; comparing the distance value between the hand and the surrounding object positioned in any direction of the hand with a second distance threshold, and comparing the distance variation between the hand and the surrounding object positioned in any direction of the hand with a distance variation threshold; comparing the distance changing speed between the hand and the surrounding object positioned in any direction of the hand with a distance changing speed threshold; and when the sum of the distance values is less than the first distance threshold, and/or when the distance value is less than the second distance threshold and the distance variation is greater than the distance variation threshold, and/or when the distance changing speed is greater than the distance changing speed threshold, determining the risk level as a risk level 1; otherwise, determining the risk level as a risk level 0.

Optionally, wherein the step of evaluating the risk level further comprises:

when the acceleration value is greater than or equal to the first acceleration threshold, comparing a first number of times that the acceleration values become greater than or equal to a second acceleration threshold within a first time range threshold with a first number threshold and a third number threshold; comparing a second number of times that the distance values become between the hand and the surrounding object in any direction of the hand less than a third distance threshold within a second time range threshold with a second number threshold and a fourth number threshold; and determining the risk level according to the comparison result.

Optionally, wherein the step of determining the risk level comprises:

when the first number of times is greater than the first number threshold, and/or when the second number of times is greater than the second number threshold, determining the risk level as a risk level 2;

when the first number of times is greater than a third number threshold and is less than or equal to the first number threshold, and/or when the second number of times is greater than a fourth number threshold and is less than or equal to the second number, determining the risk level as the risk level 1;

when the first number of times is less than or equal to the third number threshold or the second number of times is less than or equal to the fourth number threshold, determining the risk level as the risk level 0.

Optionally, after determining the risk level 1, further comprising:

when the risk level 1 lasts for a third time range threshold, upgrading the risk level 1 to the risk level 2.

As the second aspect of the invention, it relates to a hand protection device, for wearing on a hand, comprising: a detection module, an evaluation module and a prompt module; wherein: the detection module is electrically connected with the evaluation module; the evaluation module is electrically connected with the prompt module;

the detection module is configured for detecting self-motion information of the hand and relative motion information between the hand and surrounding objects; and the evaluation module is configured for evaluating a risk level of the hand injured by the surrounding objects according to the self-motion information and the relative motion information detected by the detection module; and the prompt module is configured for sending out a corresponding level of alarm according to the risk level evaluated by the evaluation module.

Optionally, wherein the detection module comprises a distance detection unit and an acceleration detection unit; the distance detection unit is configured for detecting relative distance data between the hand and the surrounding objects as the relative motion information; the acceleration detection unit is configured for detecting acceleration data of the hand as the self-motion information.

Optionally, wherein the relative distance data comprises a distance value, a distance variation and a distance changing speed;

the acceleration data comprises an acceleration value and an acceleration direction.

Optionally, wherein the evaluation module comprises: an acceleration comparison unit, a distance comparison unit and a level determination unit; wherein:

the acceleration comparison unit is configured for comparing the acceleration value with a first acceleration threshold;

the distance comparison unit is configured for, when the acceleration value is less than the first acceleration threshold: comparing the sum of the distance values between the hand and each of the surrounding objects in every directions of the hand with a first distance threshold; comparing the distance value between the hand and the surrounding object positioned in any direction of the hand with the second distance threshold, and comparing the distance variation of the hand and the surrounding object positioned in any direction of the hand with the distance variation threshold; comparing the distance changing speed of the hand and the surrounding object moving towards the hand in any direction of the hand with the distance changing speed threshold;

the level determining unit is configured for determining the risk level 1 when the sum of the distance values is less than the first distance value threshold, and/or when the distance value from any direction is less than the second distance threshold and the distance variation is greater than the distance variation threshold, and/or when the distance changing speed is greater than the distance changing speed threshold; otherwise, determining the risk level as a risk level 0.

Optionally, wherein the evaluation module further comprises a number comparison unit; the number comparison unit is configured for, when the acceleration value is greater than or equal to the first acceleration threshold, comparing the first number of times that the acceleration values become greater than or equal to the second acceleration threshold within the first time range threshold with the first number threshold and the third number threshold; comparing the second number of times that the distance values become between the hand and the surrounding object in any direction of the hand less than the third distance threshold with the second number threshold and the fourth number threshold within the second time range threshold;

the level determination unit is further configured for determining the risk level according to the comparison result.

Optionally, wherein the level determination unit is further configured for:

when the first number of times is greater than the first number threshold, and/or the second number is greater than the second number threshold, determining the risk level as a risk level 2;

when the first number of times is greater than the third number threshold and is less than or equal to the first number threshold, and/or the second number is greater than the fourth number threshold and is less than or equal to the second number threshold, determining the risk level as the risk level 1; and when the first number of times is less than or equal to the third number threshold or the second number is less than or equal to the fourth number threshold, determining the risk level as the risk level 0.

Optionally, wherein the evaluation module further comprising: the level upgrading unit is configured for upgrading the risk level 1 to a risk level 2 when the risk level 1 lasts for the third time range threshold after the level determination unit determines as the risk level 1.

Optionally, the device further comprising a power supply module, which is configured for supplying power to the device and is electrically connected with the detection module, the evaluation module and the prompt module respectively.

As the third aspect of the invention, it relates a protective glove, comprising the protection device which were mentioned as above, and a glove body, wherein the protection device is detachably mounted in the glove body.

Optionally, The protective glove further comprising a protective strip and a protective block, wherein: the protective strip is mounted on finger portion of the glove body; and the protective block is mounted on back portion of the glove body;

the distance detecting unit of the protective device is detachably mounted in the protective strip;

the acceleration detecting unit, the evaluation module, the prompt module and power supply module of the protective device are detachably mounted in the protective block.

Optionally, the protective glove, wherein a signal line and a preset socket are embedded in the protective strip and the protective block; and the detecting module, the evaluation module, the prompt module and power supply module are detachably mounted in the protective strip and the protective block by the socket, and connected by the signal line.

The beneficial effects of the above technical solution provided by the embodiment of the invention include at least:

The hand protection method provided by the embodiment of the present invention includes: detecting the movement information of the hand itself and the relative motion information between the hand and the surrounding objects; evaluating the risk level of the hand injured by the surrounding objects according to the detected motion information and relative motion information; and alarming the corresponding level according to the risk level. By collecting and synthetically evaluating the data of the hand and its surroundings, and sending out a corresponding level of alarm according to the risk level, solve the drawbacks of passive protection in the existing PPE technology. Sending out an alarm before potential injuries make user aware of the surrounded risks in advance and take proper correcting actions. The gloves provided by the embodiment of the present invention combine the active protection and passive protection, and enhance the protection more effectively by not only mitigation measure but also prevention measure, thereby greatly reducing the probability of injury to hand.

Other features and advantages of the invention will be described in subsequent descriptions, and become more apparent and understandable from the description or by implementing the invention. The intentions and other advantages of the invention can be understood and acquired by means of the description, the claims and the structures specifically pointed out in the drawings.

The following is a further detailed description of the technical scheme of the invention through the drawings, figures and examples.

BRIEF DESCRIPTION OF THE DRAWINGS

The figures are used to provide a further elaboration of the invention and form part of the specification. They are used to explain the invention together with embodiments of the invention, and do not constitute a limitation to the invention. In the drawings.

DETAILED DESCRIPTION

Figure 1:
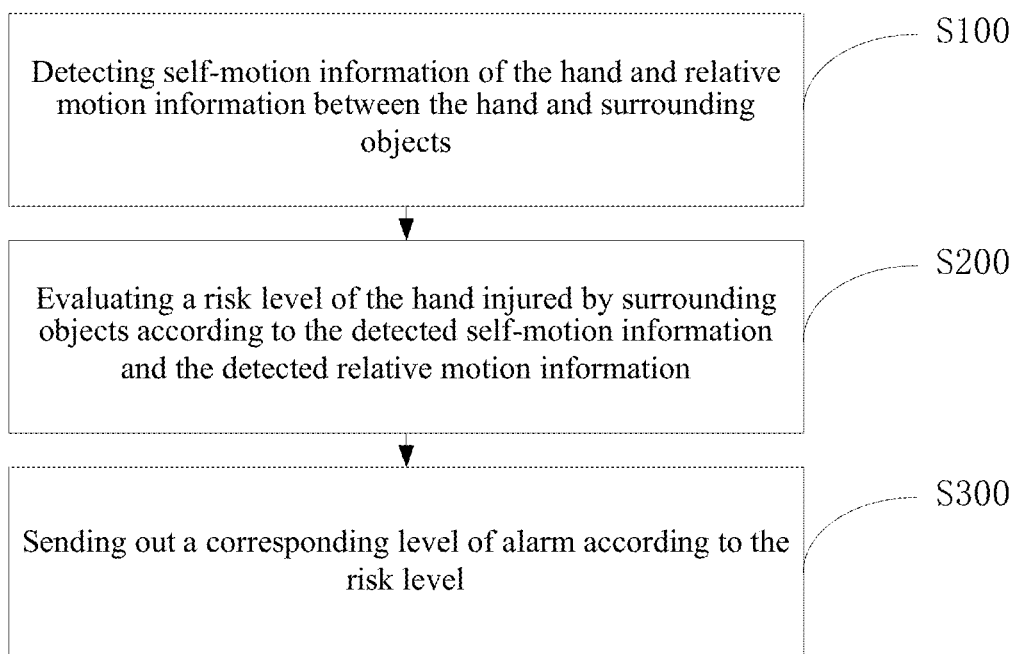
FIG. 1 is a flowchart of the hand protection method provided in case 1 of the invention.

Exemplary embodiments of the present disclosure will be described in more detail below with reference to the accompanying drawings. Although exemplary embodiments of the present disclosure are shown in the drawings, it should be understood that the present disclosure can be implemented in various forms and should not be limited by the embodiments described herein. Conversely, these embodiments are provided to enable a more thorough understanding of the disclosure and to be able to fully communicate the scope of the disclosure to those skilled in the domain.

The following is a detailed description of a hand protection method, device and specific implementation of related protective gloves provided by the embodiment of the invention.

Case 1

The embodiment of the invention provides a hand protection method, which can send out different levels of prompt signals before potential injuries after collecting and synthetically analyzing the data information of the hand and its surroundings, so that the user can aware of the surrounded risk in advance and take proper correcting action.

As shown in FIG. 1, the flow chart includes the following steps:

S100, detecting self-motion information of the hand and relative motion information between the hand and surrounding objects;

The embodiment of the invention, wherein the self-motion information is acceleration data of the hand; which comprises an acceleration value and an acceleration direction; the relative motion information is relative distance data between the hand and the surrounding objects. It comprises distance value, distance variation, and distance changing speed.

The above hand acceleration data can be measured by acceleration sensor, which is usually composed of mass block, damper, elastic element, sensitive element and adjustable circuit. In the acceleration process of the acceleration sensor, the acceleration value is obtained by using Newton's second law through measuring the inertial force on the mass block. The measured acceleration data include: the acceleration value and direction of the hand; the motion state of the hand can be judged by the above acceleration values, such as: static state, stable motion state and high-speed motion state; and the direction of the hand can be judged by the direction of acceleration, including: single direction movement. Dynamic movement in multiple directions.

The relative distance data can be measured by distance sensor or infrared sensor, which can measure the distance between the hand and the surrounding objects at any time. The distance sensor can also measure the distance change and the distance changing speed, such as the distance between the hand and the surrounding objects. The distance gets larger (smaller), or the distance changing speed get larger (smaller), and the above information of distance variation or distance changing speed is transmitted for processing.

Combining the above acceleration data and relative distance data, we can determine the multiple risk scenarios of the hand:

Risk scenario 1: The hand is in a stationary, uniform motion (stable motion) state or a relatively stable motion state. The hand is surrounded by the surrounding objects, forming a confined space for hand. When the space between the hand and the surrounding objects keeps changing, the hand is at risk of being pinched.

Risk scenario 2: The hand is in a stationary, uniform (stable) or relatively stable state, and the distance between the hand and the object in any direction keeps changing (that is, the hand side has objects close to or obstacles), then the hand is at risk of being hit;

Risk scenario 3: the state of hand is changing in high-speed (intense motion), and the hand has a "strong inertia" movement, which has the risk of colliding with the surrounding objects;

Risk scenario 4: the state of hand is changing in high-speed (intense motion), and the distance between the hand and the object in any direction keeps changing (there are objects approaching or there are obstacles exist), then the hand has the risk of being hit.

S200, evaluating a risk level of the hand injured by surrounding objects according to the detected self-motion information and the detected relative motion information;

Assessment and processing of detected information data is a complex process. It needs to analyze the distance between the hand and the surrounding objects, judge whether there are obstacles approaching, whether there are obstacles moving fast, whether there are intense repeated movements of the hand, and then compare with various preset thresholds to determine whether there are obstacles or not. Send out a corresponding levels of alarm accordingly.

Figure 2:
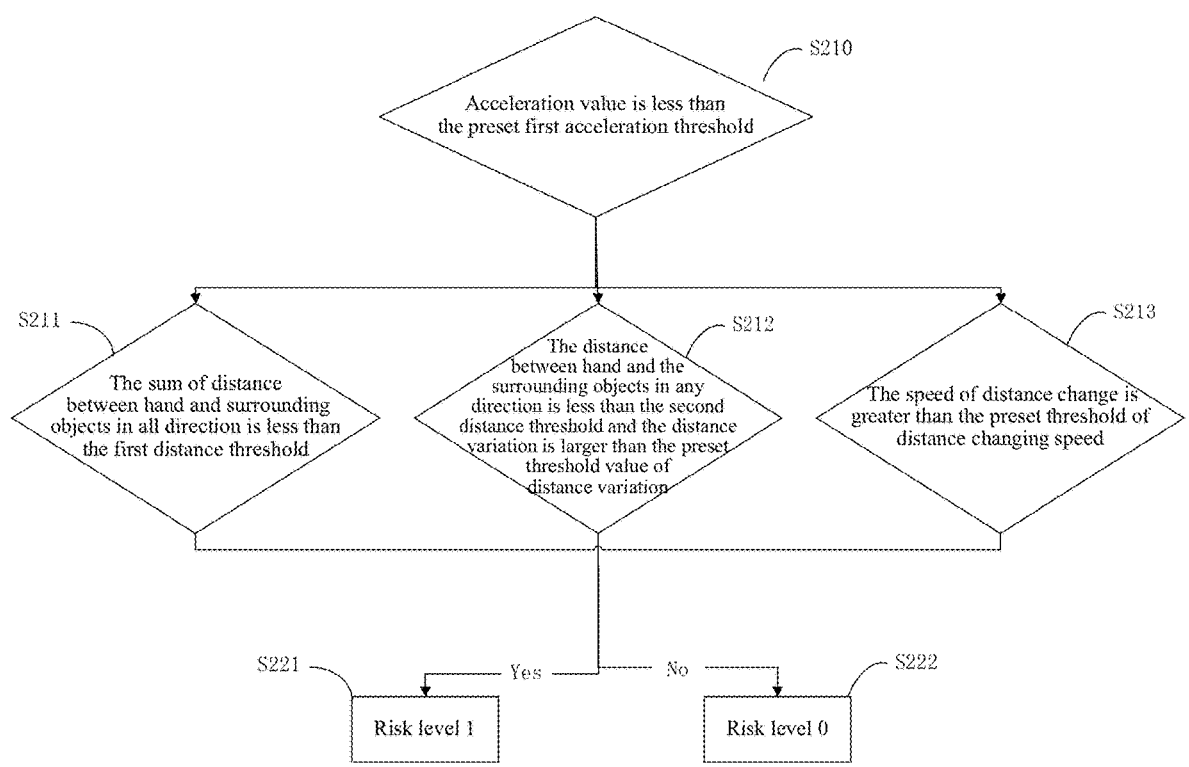
FIG. 2 is a flow chart of the first type of assessment on hand injury risk level provided in case 1 of the invention.

As shown in FIG. 2, the flow chart of the first type of assessment on hand injury risk, it includes the following steps:

S210. Compare the acceleration value with the preset first acceleration threshold; when the acceleration value is less than the preset first acceleration threshold, execute S211, and/or, execute S212, and/or execute S213;

For example, the preset threshold of the first acceleration can be 5 m/s$^2$. If the hand acceleration value obtained at this moment is 0 m/s$^2$, it can be judged that the hand is in a stationary or uniform motion state (stable state); if the acquired acceleration value of the hand is always less than 5 m/s$^2$, it can be interpreted that the hand is in a relatively stable motion state; When the acceleration value of the hand is greater than or equal to 5 m/s$^2$ at a certain time, it can be interpreted that the hand is in a state of changing on status (intense motion). The preset first acceleration threshold can be adjusted according to actual operation needs, which is not limited by the embodiment of the present invention.

When the acceleration value is less than the preset first acceleration threshold, the selected distance or/and the distance in any direction are compared with the preset threshold value; the above distance and the preset distance threshold value correspond to the above risk scenario 1 (similar to the case of door pinch); The distance, distance variation, and distance changing speed are compared with corresponding preset threshold. This is corresponded with the above-mentioned risk scenario 2 (similar to the case of an object impacting on the hand). When the acceleration value is greater than or equal to the preset first acceleration threshold, collect the number of times that acceleration value exceeds the preset second acceleration threshold. Comparing the number of times with the preset number threshold, this corresponds to the risk scenario 3 (similar to repeated swinging hammer). The number of times that the distance between the hand and the surrounding object in any direction of the hand is less than the preset distance threshold corresponds to the risk scenario 4 (similar to the scenario where one side of the object is close to the hand during hammering operation).

S211. Compare the sum of the distance values between the hand and the surrounding objects in all directions of the hand with the preset first distance threshold; when the sum of distance values is less than the first distance threshold, execute S221; otherwise, execute S222;

Similar to the risk scenario 1, examples are given as below:

For example, the preset first threshold value of distance is 100 cm, and there are currently four distance sensors corresponding to different directions (named a, b, c, d, respectively, The directions mentioned above may be in all directions around the hand or specific directions in one direction. The embodiments of the invention and the description below does not limit this setup). At specific moment of M, the distance between the distance sensor and the object around is 30 cm at a, 25 cm at b, 40 cm at c and 35 cm at d. By accumulating the distance in different directions, the sum of distance is 130 cm at this time. At time of N, the distance between the distance sensor and the object around is 32 cm at a, 25 cm at b, 23 cm at c and 21 cm at d respectively. The sum of distances is 98 cm by accumulating the distances in different directions From M to N, the sum of distance between hand and surrounding objects changes from 130 cm to 98 cm, and the sum of distance at M is greater than the first distance threshold, and the sum of distance at N is less than the first distance threshold.

S212. Compare the distance between the hand and the surrounding object in any direction of the hand with the second distance threshold, and compare the distance variation between the hand and the surrounding object in any direction of the hand with the preset distance variation threshold; when the distance value is less than the second distance threshold and the distance variation is larger than the preset threshold value of distance variation, the execution unit S221 is executed; otherwise, the execution unit S222 is executed.

Similar to the risk scenario II, examples are given as below:

For example, the second distance threshold is 20 cm and the preset distance variation threshold is 3 m/s. At present, there are four ranging sensors, which correspond to different directions (named a, b, c and d respectively). At time P, the distance between the ranging sensor and the objects around it is 30 cm at a, 18 cm at b, 40 cm at c, 35 cm at d respectively, by accumulating the distances in different directions, the sum of the distances is 123 cm, but the distance detected by ranging sensor B is less than 20 cm, and at this time the distance variation of the object in direction B is 4 m/s, the hand is at risk of being impacted by the object in direction b; At Q time, the distance between the ranging sensor and the objects around it is 25 cm at a, 22 cm at b, 35 cm at c, 45 cm at d respectively. by accumulating the distances in different directions, the sum of the distances is 127 cm, and the distances in any direction are not less than 20 cm, there is no risk of being impacted at this moment, and the distance variation of objects in all directions is not further evaluated S213. Compare the speed of distance change between the hand and the surrounding object in any direction with the preset threshold; when the speed of distance change is greater than the preset threshold of distance changing speed, execute S221; otherwise, execute S222;

For example, the preset threshold is 3.5 m/s$^2$. At present, there are also four distance sensors corresponding to different directions (named a, b, c and d respectively). The range change velocity values measured by range sensors at moment G are 1 m/s$^2$, 1.5 m/s$^2$, 3 m/s$^2$ and 4.2 m/s$^2$ respectively. At this time, if the detected speed of distance change in any direction is greater than the preset threshold, then execute S221, which is risk level 1. As long as the distance changing speed of the object moving towards the hand in at least one direction is detected to be greater than the preset threshold, execute S221

S221, Risk level 1 is determined

As above, at moment of N, if the sum of distances is less than the first distance threshold, then rick level 1 is determined; At moment of P, if the distance detected by distance sensor b in the direction of b is less than the second distance threshold and the distance variation is greater than the preset distance variation threshold, rick level 1 is determined; at moment of G, If the change speed of object distance is greater than the preset threshold, rick level 1 is determined.

S222, rick level 0 is determined.

At the moment M, If the sum of the distances is greater than the first distance threshold, risk leve0 is determined for moment M; At the moment Q, if the distance of any distance sensor in the direction is not less than the preset second distance threshold, risk leve0 is determined for moment Q.

As long as either of these conditions is satisfied, the above-mentioned conditions (S211 and S212 and 213), S221 will be executed. If two or three conditions are met, S221 is also executed.

Figure 3:
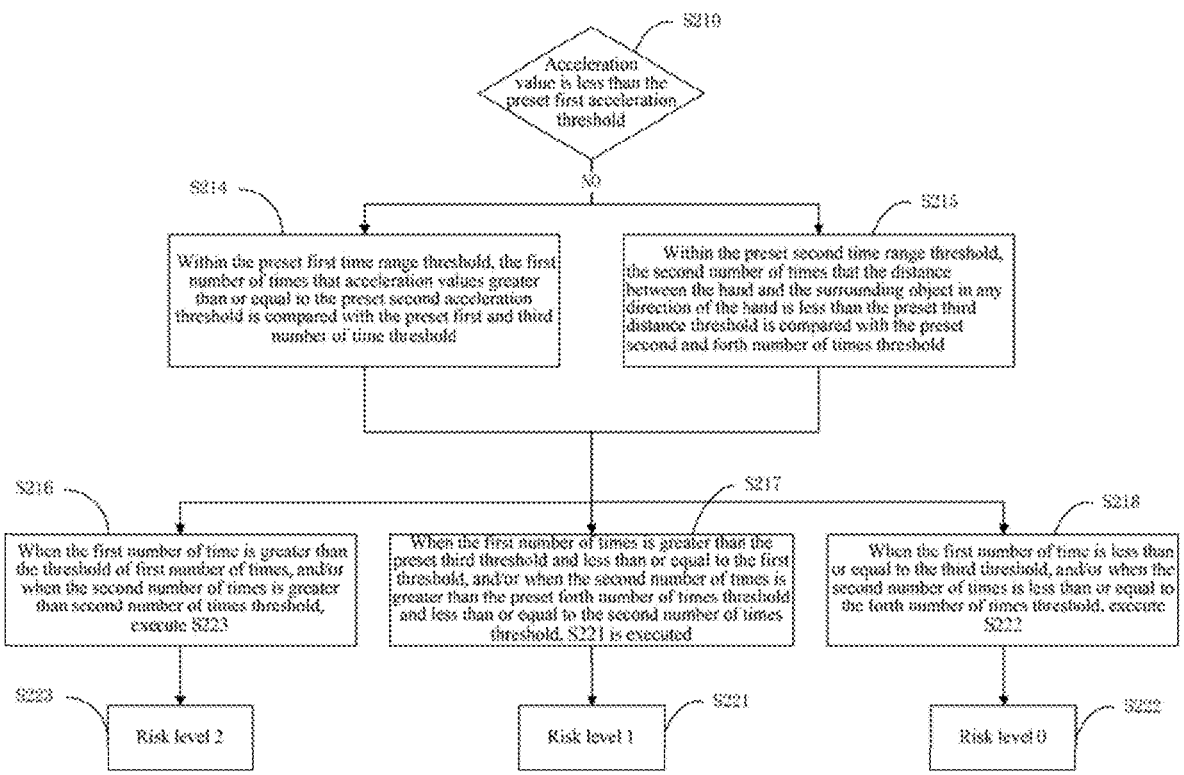
FIG. 3 is a flow chart of the second type of assessment on hand injury risk level provided in case 1 of the invention.

As shown in FIG. 3, the flow chart of the second type of assessment on hand injury risk, it includes the following steps:

S210. Compare the acceleration value with the preset first acceleration threshold. When the acceleration value is greater than or equal to the preset first acceleration threshold, execute S214 and/or execute S215.

S214. In the preset first time range threshold, the first number of times that acceleration values greater than or equal to the preset second acceleration threshold is compared with the preset first and third number of time threshold.

S216. When the first number of time is greater than the threshold of first number of times, execute S223

S217. When the first number of times is greater than the preset third threshold and less than or equal to the first threshold, S 221 is executed.

S218. When the first number of time is less than or equal to the third threshold, execute S222.

Similar to the risk scenario 3, examples are given as below:

For example, the preset first time range threshold is 10 s, the preset second acceleration threshold is 8 m/s², the preset first number of times threshold is 4, and the preset third number of times threshold is 3. 10 effective hand acceleration values were detected in 10 seconds, and the acceleration values are 8.28 m/s², 5.8 m/s², 7.88 m/s², 11.28 m/s², 8.58 m/s², 6.68 m/s², 9.38 m/s², 6.5 m/s², 7.6 m/s² and 10.58 m/s², respectively. The number of times that exceed the preset second acceleration threshold (8 m/s²) are 5

S215. Within the preset second time range threshold, the second number of times that the distance between the hand and the surrounding object in any direction of the hand is less than the preset third distance threshold is compared with the preset second and forth number of times threshold S216. When the second number of times is greater than second number of times threshold, execute S223.

S217. When the second number of times is greater than the preset forth number of times threshold and less than or equal to the second number of times threshold, S221 is executed.

S218. When the second number of times is less than or equal to the forth number of times threshold, execute S222.

Similar to risk scenario 4, examples are given as below

For example, the preset second time range threshold is 10 s, the preset third distance threshold is 20 cm, the preset second time of times threshold is 5 and the forth number of times threshold is 2. The embodiment of the present invention also has four distance sensors corresponding to different directions (named a, b, c, d respectively), and an acceleration sensor. Ten sets of valid data are detected within the preset second time threshold. The specific data results are shown in Table 1.

table 1, if the hand has a tendency to move in the d direction, and the object in the d direction is also close to the hand, the hand has a high risk of being hit.

S221, Risk level 1 is determined
S222, Risk level 0 is determined
S223, Risk level 2 is determined The number of times that the acceleration value in the first time range threshold exceeds the second acceleration threshold 5 times, which is greater than the preset first number of times threshold (4 times), then risk level 2 is determined; if the measured value is three times, risk level 1 is determined, and if it is one time, risk level 0 is determined. In the above example, within the second time range threshold, the second number of times when the distance between the hand and the surrounding object in any direction of the hand is less than the preset third distance threshold is greater than the preset second time of times threshold, risk level 2 is determined.

S300. sending out a corresponding level of alarm according to the risk level.

Risk alarms can be buzzing, LED lights, vibrators, etc. Alerts can be divided into level 1 alert and level 2 alert. For example, the level 1 alert can be low-frequency flash of the LED lamp and buzzing; the level 2 alert can be high-frequency flash of the LED lamp and buzzing. The embodiment of the invention does not specify how to realize the warning and how to divide the warning into several level.

In an optional implementation, after risk level 1 is determined, risk will be further assessed and up grade to risk level 2 if the risk level 1 continues and the duration exceed preset third time range threshold.

In the actual operation, different risk levels can be converted to each other, because actual risk keep change in operation. For example, the preset third time range threshold is 6 second, if the risk level 1 last more then 6 second, risk level is upgraded. For example, at the moment of N or P, the risk level1 is maintained for 6 seconds, and then it is

TABLE 1

| Distance (cm) | Acceleration (m/s²) | | | | | | | | | |
| --- | --- | --- | --- | --- | --- | --- | --- | --- | --- | --- |
| | 1 | 2 | 3 | 4 | 5 | 6 | 7 | 8 | 9 | 10 |
| Direction a | 8.3 | 6.3 | 5.5 | 7.9 | 9.3 | 5.8 | 5.3 | 7.4 | 6.9 | 8.6 |
| | 32 | 44 | 12 | 28 | 25 | 52 | 21 | 32 | 37 | 25 |
| Direction b | 8.3 | 6.3 | 5.5 | 7.9 | 9.3 | 5.8 | 5.3 | 7.4 | 6.9 | 8.6 |
| | 28 | 27 | 33 | 25 | 19 | 21 | 42 | 29 | 13 | 29 |
| Direction c | 8.3 | 6.3 | 5.5 | 7.9 | 9.3 | 5.8 | 5.3 | 7.4 | 6.9 | 8.6 |
| | 25 | 21 | 27 | 30 | 38 | 26 | 11 | 26 | 28 | 31 |
| Direction b | 8.3 | 6.3 | 5.5 | 7.9 | 9.3 | 5.8 | 5.3 | 7.4 | 6.9 | 8.6 |
| | 43 | 17 | 42 | 21 | 25 | 27 | 32 | 15 | 27 | 27 |

Four distance sensors in Table 1, which correspond to different directions (named a, b, c and d respectively), are used to calculate the distance between the four directions of the hand and the objects around it, and the acceleration of the hand is also calculated. From Table 1, we can see that only three groups of acceleration values exceed the second acceleration threshold in 10 seconds (group 1, group 5 and group 10 respectively), and the number of times that the relative distance between any hand and surrounding objects is less than the preset third distance threshold are detected. They are group 2 in d direction, group 3 in a direction, group 5 in b direction, group 7 in c direction, Group 8 in d direction and group 9 in b direction respectively. Total 6 times was counted that the distance is less than the preset third distance threshold (20 cm), which are larger than the preset second number of times threshold (5 times). In the group 2 from upgraded to risk level 2. Because the objects around the hand may continue to be close to the hand, the risk of hand injury increases, and the risk level increases gradually with time. On the contrary, Failure to meet the high-risk level conditions will automatically degrade after a certain period of time, which is no longer described in the embodiment of the present invention.

The first acceleration threshold, the second acceleration threshold, the first distance threshold, the second distance threshold, the third distance threshold, the distance variation threshold, the distance changing speed threshold, the first number of times threshold, the second number of times threshold, the third number of times threshold, the forth number of times threshold, the first time range threshold, the second time range threshold and the third time range threshold. These values as well as how many threshold need to be defined can be adjusted according to different situations in actual operation, and the embodiment of the present invention does not specifically limit the values.

The hand protection method provided by the embodiment of the invention solves the drawbacks of passive protection, and proposes a new active protection with early warning capability, which enable user aware the surrounding environment more quickly/better and adjust themselves to avoid injury in advance according to different levels of prompt signals, thus greatly reducing the probability of injury.

Case 2

Figure 4:
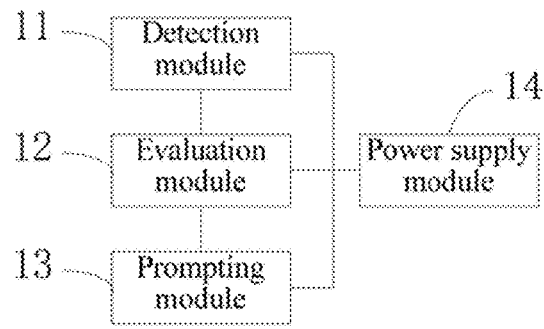
FIG. 4 is a schematic diagram of a protective device provided in case 2 of the invention.

The second aspect of the embodiment of the present invention relates to a hand protection device. As shown in FIG. 4, the device includes: detection module 11, evaluation module 12 and prompting module 13, in which detection module 11 is electrically connected with evaluation module 12, and evaluation module 12 is electrically connected with prompting module 13.

Detection module 11 is used to detect the motion information of the hand itself and the relative motion information between the hand and the surrounding objects; evaluation module 12 is used to assess the risk level of the hand based on the motion information and relative motion information detected by the detection module; and prompt module 13 is used to rise the corresponding level of alarm according to the evaluation module. Assessment and processing of collected information data is a complex process. It needs to analyze the status of hand as well as the distance between the hand and the surrounding objects, judge whether there are obstacles approaching, whether there are obstacles moving fast, whether there are intense repeated movements of the hand, and then compare with various preset thresholds to determine whether there are risks or not. Send out a corresponding levels of alarm accordingly.

The above mentioned electrical connection may be direct connection, mostly through signal lines; or indirect connection, i.e. through virtual signals such as network connection; or electromagnetic induction coupling connection, which is not specifically limited by the embodiment of the invention.

The hand protection device provided by the embodiment of the invention collects the motion information of the hand itself and the relative motion information between the hand and the surrounding objects by the detection module, and then sends out different levels of prompt signals after comprehensive evaluation and judgment by the evaluation module, thus solving the drawback of the passive prevention in the existing technology, and proposes a new active protection with early warning capability, which enables user to understand the surrounding environment more quickly and adjust themselves in advance, which greatly reduces the probability of injury.

Figure 5:
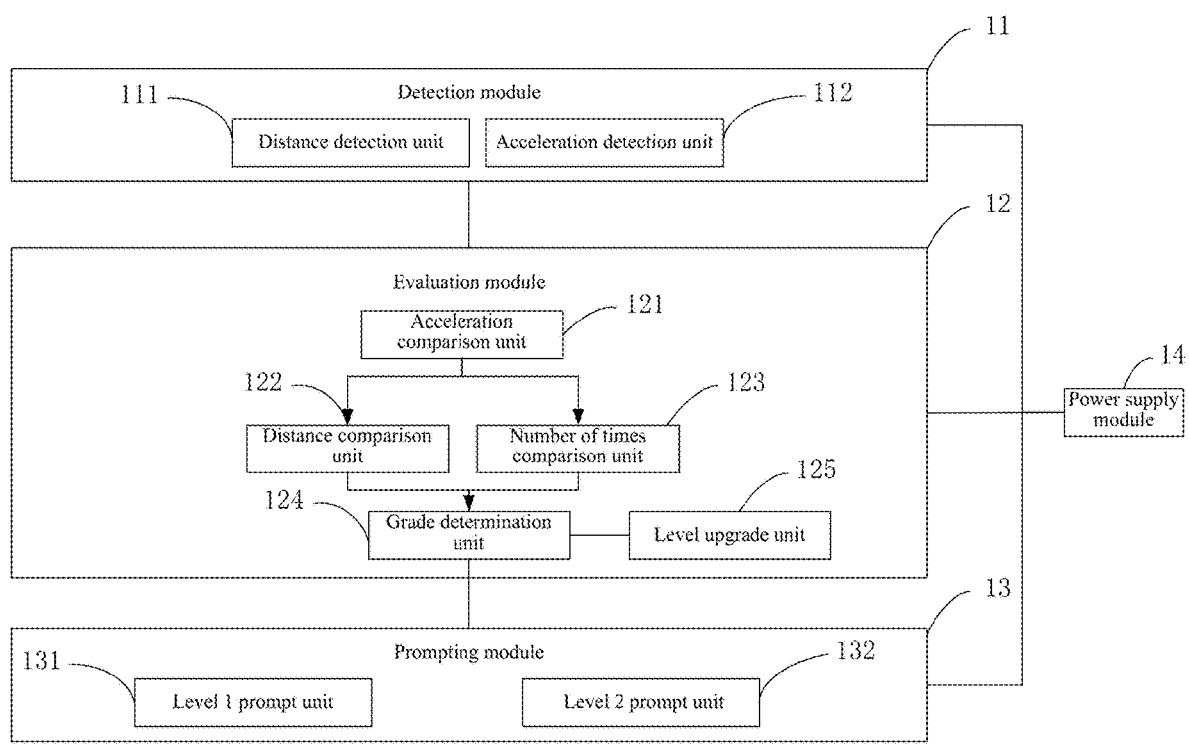
FIG. 5 is the specific structural diagram of the protective device provided in the case 2 of the invention.

In an optional embodiment, referring to FIG. 5, the detection module 11 of the device includes a distance detection unit 111 and an acceleration detection unit 112, wherein the distance detection unit 111 is used to detect the relative distance data between the hand and the surrounding objects as the relative motion information, and the acceleration detection unit 112 is used to detect the hand acceleration data used as their own motion information.

The detailed description of the distance detection unit 111 and the acceleration detection unit 112 and the specific implementation method are described with reference to the method part in case 1, and will not be repeated here.

In an optional implementation, the relative distance data includes: distance value, distance variation value and distance changing speed; and the acceleration data includes acceleration value and acceleration direction.

In an optional embodiment, as shown with reference to FIG. 5, the evaluation module 12 includes an acceleration comparison unit 121, a distance comparison unit 122, and a grade determination unit 124, wherein:

The acceleration comparison unit 121 is used to compare the acceleration value with the preset first acceleration threshold, and the distance comparison unit 122 is used when the acceleration value is less than the first acceleration threshold: To compare the sum of the distance values between the hand and the surrounding objects in all directions of the hand with the preset first distance threshold; To compare the distance between the hand and the surrounding object in any direction of the hand is compared with the second distance threshold, and the distance change between the hand and the surrounding object in any direction of the hand is compared with the preset distance variation threshold; To compare the distance changing speed with the preset distance changing speed threshold; The grade determination unit 124 is used when the sum of distance values is less than the first distance threshold, and/or when the distance value is less than the second distance threshold and the distance change is greater than the preset distance changing speed threshold, and/or when the distance change speed is greater than the preset distance change value. If it is larger than the preset threshold of distance change speed, it will be determined as risk level 1; otherwise, it will be determined as a risk level 0

The detailed introduction of the speed comparison unit 121, the distance comparison unit 122 and the grade determination unit 124 and the specific implementation method described in the method part in case 1 are not repeated here.

In an optional embodiment, as shown in FIG. 5, the evaluation module 12 includes: the number of times comparison unit 23 is used when the acceleration value is greater than or equal to the first acceleration threshold: With in a preset first time range threshold, the first number of times that acceleration value is greater than or equal to the preset second acceleration threshold is compared with the first and third number of times threshold; With in preset second time range threshold, the second number of times that distance between the hand and the surrounding object in any direction of the hand is less than the preset third distance threshold is compared with the second and forth number of times threshold.

The detailed description of the number comparison unit 123 and the specific implementation method refer to the description of the method section in case 1 and will not be repeated here.

In an optional embodiment, the above level determination unit 124 is also used to determine the risk level based on the comparison results. Specific can be: when the first number of times is greater than the first number of times threshold, and/or, when the second number of times is greater than the second number of times threshold, risk level 2 is determined; when the first number of times is greater than the preset third number of times threshold and less than or equal to the first number of times threshold, and/or when the second number of times is greater than the preset fourth number of times threshold and less than the preset second number of times threshold. When the first number of times is less than or equal to the third number of times threshold or the second number of times is less than or equal to the fourth number of times threshold, the risk level 0 is determined.

In an optional implementation, as shown in FIG. 5, the evaluation module 12 also includes a level upgrade unit 125, which is used after risk level 1 is determined: when risk level 1 status last longer than the preset third time range threshold, risk level 1 is upgraded to risk level 2.

In an optional embodiment, as shown in FIG. 5, the prompt module 13 includes: the level 1 prompt unit 131 and the level 2 prompt unit 132; where the level 1 prompt unit 131 receives the risk level 1 signal confirmed by the above-mentioned level confirmation unit 124 and performs the level 1 prompt alarm; and the level 2 prompt unit 132 receives the above-mentioned level confirmation form. The risk level 2 signal confirmed by unit 124 performs the level 2 prompt alarm Risk alarms can be buzzing, LED lights, vibrators, etc. For example, the level 1 alert can be low-frequency flash of the LED lamp and buzzing; the level 2 alert can be high-frequency flash of the LED lamp and buzzing. The embodiment of the present invention does not specify how to realize the warning and how to divide the warning into several level.

In an optional embodiment, as shown in FIG. 4 or 5, the device also includes a power supply module 14, which provides power to the device and is electrically connected with the detection module 11, the evaluation module 12 and the prompting module 13, respectively.

Case 3

The third aspect of the embodiment of the present invention relates to a protective glove, comprising the electrical device mentioned as above and the glove body, wherein the protective device is detachably mounted in the glove body.

The electrical device can be tied to the glove body; the electrical device can also be made into a thin glove shape. When applied, the glove body can be worn on the hand first, and then on the outside, which can also achieve the same technical effect. The application life of the electrical device is much longer than that of the glove body. After the glove body is damaged, the glove body can be replaced, and the electrical device can continue to be used with the new glove body. The protective device and glove body can also be combined in various ways, and the embodiments of the invention cannot be fully illustrated.

The glove body can be knitted or sewed gloves, or rubber gloves, etc. The embodiment of the invention does not specify the material of the glove body.

In an optional embodiment, the protective gloves can also include: protective strip and protective block, which are fixed at the finger position of the glove body; protective block is installed at the back of the glove body; distance detection unit in the protective device is detachably installed in the protective strip; and acceleration detection unit, the evaluation module, the prompting module and the power supply module can be detachably installed in the protective block.

The main materials of the protective strip and the protective block can be thermoplastic resin, plastic, rubber, etc. The protective strip and the protective block can be connected to the finger and back of the glove body by sewing, pasting and ironing.

In an optional embodiment, the protective strip and block are embedded with signal lines and preset sockets, and the detection module, evaluation module and prompt module are detachably mounted in the strip and block through the sockets and connected by the signal lines.

The preset sockets can be engineering plastics, which can be designed as the connection mode of groove sliding, and can also have self-locking function. Besides, there are protective strips or blocks outside the plastic sockets to avoid the damage of the electrical devices mentioned above when impacting.

Figure 6:
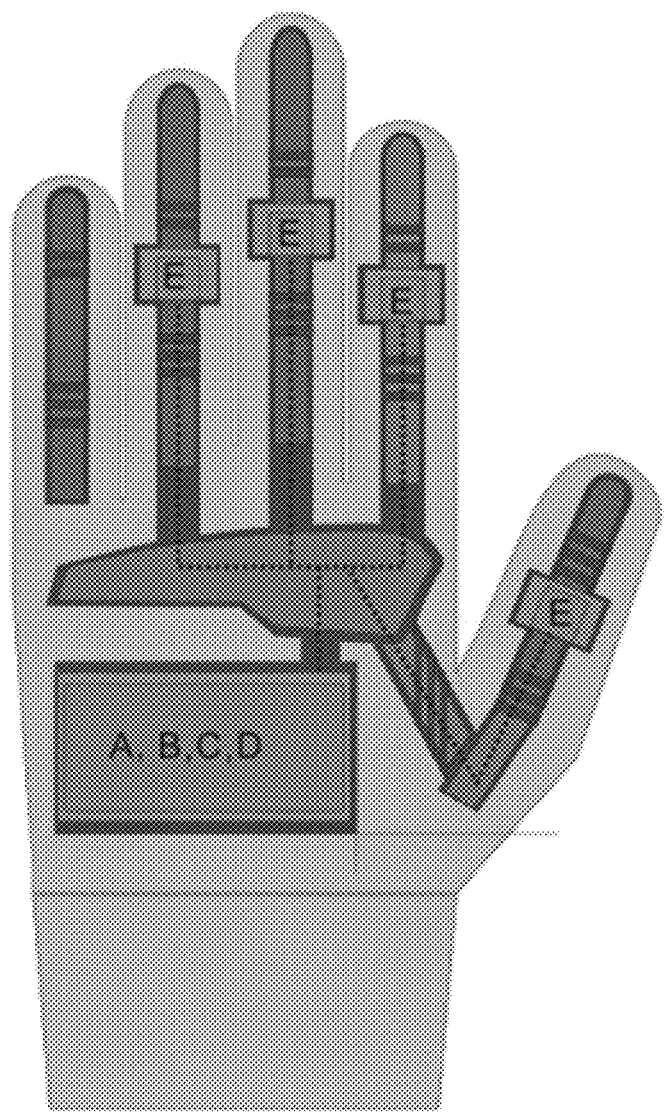
FIG. 6 is a schematic diagram of a specific protective glove provided in case 3 of the invention.

In a specific embodiment, as shown in FIG. 6, the light-gray part of the figure is the glove body, the dark-gray part is the protective strip at the finger position of the glove body and the protective block at the back of the hand. The protective strip or the protective block is embedded with an engineering plastic socket, and the electrical device is detachable through engineering plastic and installed in protective strips or blocks.

As shown in FIG. 6, the detection module, the evaluation module and the prompting module of the hand protective device are detachably mounted on the protective strips or the protective block through the engineering plastic socket, respectively. In the embodiment of the invention, the distance detection unit (shown as E in FIG. 6) is installed in the finger position, of course, according to the need of operation. The quantity and location can be adjusted according to the actual demand. As shown in FIG. 6, the distance detection unit in the protective glove provided by the embodiment of the invention is designed to be located at the second joint of the finger, thus more typically representing the position and risk situation of the finger. Acceleration detection unit (shown as A in FIG. 6) is detachably mounted on the protective block at the back of the hand through the above engineering plastic socket. The acceleration detection unit is designed at the back of the hand, which can better represent the overall acceleration and movement direction of the hand. Assessment module (shown as B in FIG. 6), prompt module (shown as C in FIG. 6) and power supply module (shown as D in FIG. 6) are detachably mounted on the protective block at the back of the hand through the above engineering plastic socket. The positions of each module at the back of the hand can be adjusted according to the actual needs. The embodiments of the invention do not limit this.

As for the detection module mentioned above, because of the different work types and working environment, operators face different risks. The direction and complexity of hand collision risk faced by different users are different, so different work types will have different design requirements. The location will be adjusted according to the actual needs. In principle, the larger and more complex the collision risk environment is, the more detection modules and more direction/location overage are needed, In the application of protective gloves, the operator receives alarm, through risk re-assessment, adjusting the position of the hand, adjusting the movement posture or movement mode, so that the operator's working state can be returned to the safe zone, thereby fundamentally reducing the probability of injuries.

The dotted line in FIG. 6 is a signal line embedded in the protective strip or block, which enable the electrical connection between various parts of the hand protective device. Of course, the signal line is not mandatory, and the wireless connection or coupling connection of various parts of the hand protective device is not limited by the embodiment of the present invention.

Based on the same inventive concept, an embodiment of the invention also provides a computer readable storage medium on which computer instructions are stored, and when executed by a processor, the hand protection method as described above is realized.

Unless otherwise specified, terms such as processing, computation, operation, determination, display, etc. may refer to the actions and/or processes of one or more processing or computing systems or similar devices, which will be expressed as data operations and processes of physical (e.g., electronic) quantities in registers or memory of processing systems, converting to other data similar to the storage, register or other such information stored, transmitted, or displayed in the device of the processing system. Information and signals can be represented by any of a variety of different technologies and methods. For example, the data, instructions, commands, information, signals, bits, symbols and chips mentioned throughout the above description may be represented by voltage, current, electromagnetic waves, magnetic fields or particles, light fields or particles or any combination thereof.

It should be understood that the specific sequence or hierarchy of steps in the process of disclosure is an example. Based on design preferences, it should be understood that a particular sequence or level of steps in the process can be rearranged without departing from the scope of protection of the disclosure. The appended method claims give elements of various steps in an exemplary order are not intend to limit specified order.

In the detailed description described above, various features are combined in a single implementation scheme to simplify the disclosure. This disclosure method should not be interpreted as reflecting the intention that the implementation of the subject matter to be protected requires more features clearly stated in each claim. On the contrary, as reflected in the appended claims, the invention is in a state in which there are fewer features than all of the disclosed individual implementations. Accordingly, the appended claims are hereby clearly incorporated into the detailed description, in which each claim is a separate preferred implementation of the present invention.

It should also be understood by expert in the domain that various illustrative logic boxes, modules, circuits and algorithm steps described in connection with the embodiments of this article can be implemented as electronic hardware, computer software or combinations thereof. In order to clearly illustrate the interchangeability between hardware and software, various illustrative components, boxes, modules, circuits and steps are generally described around their functions. Whether this function is realized as hardware or software depends on the specific application and design constraints imposed on the whole system. Skilled technical person can implement the described functions in a flexible manner for each particular application, but such implementation decisions should not be interpreted as deviating from the scope of protection of the disclosure.

The steps of the method or algorithm described in the embodiments of this article can be embodied directly in hardware, and software modules executed by processors, or combinations thereof. Software modules may be located in RAM memory, flash memory, ROM memory, EPROM memory, EEPROM memory, registers, hard disks, mobile disks, CD-ROM or any other form of storage medium known in the field. An exemplary storage medium is connected to the processor so that the processor can read information from the storage medium and write information to the storage medium. Of course, storage media can also be part of the processor. Processors and storage media can be located in ASIC. The ASIC can be located in the user terminal. Of course, processors and storage media can also exist as discrete components in user terminals.

For software realization, the techniques described in this application may be implemented by modules (e.g., processes, functions, etc.) that perform the functions described in this application. These software codes can be stored in memory units and executed by processors. Memory units can be implemented in or outside the processor. In the latter case, they are coupled to the processor by various means of communication, which is well known in the field.

The description above includes one or more examples of embodiments. Of course, it is impossible to describe all possible combinations of components or methods in order to describe the above-mentioned embodiments, but it should be recognized by those skilled people in the domain that the embodiments can be further combined and arranged. Therefore, the embodiments described herein are intended to cover all such changes, modifications and variations falling within the scope of the protection of the appended claims. In addition, any term "or" used in the specification of the claims is used to denote "non-exclusive or".

Obviously, technical people in the domain can make various changes and variations to the invention without departing from the spirit and scope of the invention. Thus, if these modifications and variations of the present invention fall within the scope of the claims of the invention and their equivalent technologies, the present invention is also intended to include these modifications and variations.

What is claimed is:

1. A hand protection method, comprising:
   detecting self-motion information of the hand and relative motion information between the hand and surrounding objects, in which the self-motion information is acceleration data of the hand comprising an acceleration value and an acceleration direction, the relative motion information is relative distance data between the hand and the surrounding objects comprising a distance value, a distance variation, and a distance changing speed;
   evaluating a risk level of the hand injured by the surrounding objects according to the detected self-motion information and the detected relative motion information; and
   sending out a corresponding level of alarm according to the risk level;
   wherein evaluating the risk level comprises:
     comparing the acceleration value with a first acceleration threshold;
     when the acceleration value is less than the first acceleration threshold, comparing a sum of the distance values between the hand and each of the surrounding objects in every direction of the hand with a first distance threshold; comparing the distance value between the hand and the surrounding object positioned in any direction of the hand with a second distance threshold, and comparing the distance variation between the hand and the surrounding object positioned in any direction of the hand with a distance variation threshold; comparing the distance changing speed between the hand and the surrounding object positioned in any direction of the hand with a distance changing speed threshold; and
     when the sum of the distance values is less than the first distance value threshold, and/or when the distance value is less than the second distance threshold and the distance variation is greater than the distance variation threshold, and/or when the distance changing speed is greater than the distance changing speed threshold, determining the risk level as a risk level 1;
     otherwise, determining the risk level as a risk level.

2. The method of claim 1, wherein the step of evaluating the risk level further comprises:
   when the acceleration value is greater than or equal to the first acceleration threshold, comparing a first number of times that the acceleration values become greater than or equal to a second acceleration threshold within a first time range threshold with a first number threshold and a third number threshold; comparing a second number of times that the distance values become between the hand and the surrounding object in any direction of the hand less than a third distance threshold within a second time range threshold with a second number threshold and a fourth number threshold; and determining the risk level according to the comparison result.

3. The method of claim 2, wherein the step of determining the risk level comprises:

when the first number is greater than the first number threshold, and/or when the second number is greater than the second number threshold, determining the risk level as a risk level 2;

when the first number is greater than a third number threshold and is less than or equal to the first number threshold, and/or when the second number is greater than a fourth number threshold and is less than or equal to the second number, determining the risk level as the risk level 1;

when the first number is less than or equal to the third number threshold or the second number is less than or equal to the fourth number threshold, determining the risk level as the risk level 0.

4. The method of claim 1, after determining the risk level 1, further comprising:

when the risk level 1 lasts for a third time range threshold, upgrading the risk level 1 to the risk level 2.

5. The method of claim 3, after determining the risk level 1, further comprising:

when the risk level 1 lasts for a third time range threshold, upgrading the risk level 1 to the risk level 2.

6. A hand protection device, for wearing on a hand, comprising: a detection module, an evaluation module and a prompt module; wherein:

the detection module is electrically connected with the evaluation module; the evaluation module is electrically connected with the prompt module;

the detection module is configured for detecting self-motion information of the hand and relative motion information between the hand and surrounding objects;

the evaluation module is configured for evaluating a risk level of the hand injured by the surrounding objects according to the self-motion information and the relative motion information detected by the detection module; and the prompt module is configured for sending out a corresponding level of alarm according to the risk level evaluated by the evaluation module;

wherein the detection module comprises a distance detection unit and an acceleration detection unit;

the distance detection unit is configured for detecting relative distance data between the hand and the surrounding objects as the relative motion information comprising a distance value, a distance variation and a distance changing speed;

the acceleration detection unit is configured for detecting acceleration data of the hand as the self-motion information comprising an acceleration value and an acceleration direction;

the evaluation module comprises an acceleration comparison unit, a distance comparison unit and a level determination unit;

the acceleration comparison unit is configured for comparing the acceleration value with a first acceleration threshold;

the distance comparison unit is configured for, when the acceleration value is less than the first acceleration threshold; comparing the sum of the distance values between the hand and each of the surrounding objects in every directions of the hand with a first distance threshold; comparing the distance value between the hand and the surrounding object positioned in any direction of the hand with the second distance threshold, and comparing the distance variation of the hand and the surrounding object positioned in any direction of the hand with the distance variation threshold; comparing the distance changing speed of the hand and the surrounding object in any direction of the hand with the distance changing speed threshold; and the level determining unit is configured for determining the risk level 1 when the sum of the distance values is less than the first distance value threshold, and/or when the distance value is less than the second distance threshold and the distance variation is greater than the distance variation threshold, and/or when the distance changing speed is greater than the distance changing speed threshold; otherwise, determining the risk level as a risk level 0.

7. The device of claim 6, wherein the evaluation module further comprises a number comparison unit;

the number comparison unit is configured for, when the acceleration value is greater than or equal to the first acceleration threshold, comparing the first number of times that the acceleration values become greater than or equal to the second acceleration threshold within the first time range threshold with the first number threshold and the third number threshold; comparing the second number of times that the distance values become between the hand and the surrounding object in any direction of the hand less than the third distance threshold with the second number threshold and the fourth number threshold within the second time range threshold;

the level determination unit is further configured for determining the risk level according to the comparison result.

8. The device of claim 7, wherein the level determination unit is further configured for:

when the first number is greater than the first number threshold, and/or the second number is greater than the second number threshold, determining the risk level as a risk level 2;

when the first number is greater than the third number threshold and is less than or equal to the first number threshold, and/or the second number is greater than the fourth number threshold and is less than or equal to the second number threshold, determining the risk level as the risk level 1; and when the first number is less than or equal to the third number threshold or the second number is less than or equal to the fourth number threshold, determining the risk level as the risk level 0.

9. The device of claim 8, wherein the evaluation module further comprising:

the level upgrading unit is configured for upgrading the risk level 1 to a risk level 2 when the risk level 1 lasts for the third time range threshold after the level determination unit determines as the risk level 1.

10. The device of claim 6, further comprising a power supply module, which is configured for supplying power to the device and is electrically connected with the detection module, the evaluation module and the prompt module respectively.

11. A protective glove, comprising the protection device of claim 6 and a glove body, wherein the protection device is detachably mounted in the glove body.

12. The protective glove of claim 11, further comprising a protective strip and a protective block, wherein:
   the protective strip is mounted on finger portion of the glove body; and the protective block is mounted on back portion of the glove body;
   the distance detecting unit of the protective device is detachably mounted in the protective strip;
   the acceleration detecting unit, the evaluation module, and the prompt module of the protective device are detachably mounted in the protective block.

13. The protective glove of claim 12, wherein a signal line and a preset socket are embedded in the protective strip and the protective block; and the detecting module, the evaluation module and the prompt module are detachably mounted in the protective strip and the protective block by the socket, and connected by the signal line.

\* \* \* \* \*